US012777063B2

(12) United States Patent
Amiga et al.

(10) Patent No.: US 12,777,063 B2
(45) Date of Patent: Oct. 27, 2026

(54) VULNERABILITY DETECTION AND DEFINITION USING A LARGE LANGUAGE MODEL

(71) Applicant: Cisco Technology, Inc., San Jose, CA (US)

(72) Inventors: Gafnit Amiga, Petah Tikva (IL); Ben Gabay, Kiryat Motzkin (IL); Gal Bashan, Tel Aviv (IL); Dana Tsymberg, Holon (IL); Reem Rotenberg, Ramat Gan (IL); Gil Baron, Giv'atayim (IL); Or Azarzar, Herzeliya (IL)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 18/817,470

(22) Filed: Aug. 28, 2024

(65) Prior Publication Data

US 2026/0067316 A1 Mar. 5, 2026

Related U.S. Application Data

(60) Provisional application No. 63/567,730, filed on Mar. 20, 2024.

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 11,973,794 | B1 * | 4/2024 | Levi | G06F 21/577 |
| 12,425,435 | B1 * | 9/2025 | Manzi | G06F 16/24522 |
| 2007/0177615 | A1 * | 8/2007 | Miliefsky | H04L 65/1079 370/401 |
| 2019/0147167 | A1 | 5/2019 | Kim et al. | |
| 2020/0007571 | A1 * | 1/2020 | Gottschalk | H04L 63/0227 |

(Continued)

FOREIGN PATENT DOCUMENTS

| | | | | |
|---|---|---|---|---|
| CN | 117099344 A | * 11/2023 | | H04L 63/20 |
| CN | 118489230 A | * 8/2024 | | H04L 67/12 |

(Continued)

OTHER PUBLICATIONS

CVE: "CVE® Program Mission", Retrieved from https://www.cve.org/ on May 22, 2024, 3 Pages.

(Continued)

*Primary Examiner* — Sarah Su
(74) *Attorney, Agent, or Firm* — Merchant & Gould P.C.; Kenneth J. Heywood

(57) ABSTRACT

In one implementation, a device identifies a first set of one or more Common Vulnerabilities and Exposures (CVEs) by searching a CVE database based on a request sent via a network towards a service. The device also identifies a second set of one or more CVEs by querying a large language model (LLM) based on the request. The device determines that the request is associated with a particular CVE based on the first set of one or more CVEs and the second set of one or more CVE. The device initiates a corrective measure with respect to the request in the network.

20 Claims, 9 Drawing Sheets

(56) References Cited

U.S. PATENT DOCUMENTS

| | | | | |
|---|---|---|---|---|
| 2021/0203678 | A1 | 7/2021 | Alagar et al. | |
| 2022/0269791 | A1 | 8/2022 | Ansell et al. | |
| 2023/0035121 | A1 | 2/2023 | Wei et al. | |
| 2023/0075290 | A1 | 3/2023 | Wåreus | |
| 2023/0388330 | A1* | 11/2023 | Zelivansky | H04L 63/1433 |
| 2024/0171614 | A1* | 5/2024 | Crabtree | H04L 63/20 |
| 2025/0063065 | A1* | 2/2025 | Mermoud | H04L 63/1416 |
| 2025/0106237 | A1* | 3/2025 | Ghosh | H04W 12/12 |
| 2025/0119747 | A1* | 4/2025 | Roy | H04W 12/122 |
| 2025/0141912 | A1* | 5/2025 | Hill | H04L 63/1433 |
| 2025/0190604 | A1* | 6/2025 | Fu | G06F 16/242 |
| 2025/0238520 | A1* | 7/2025 | Ramiah | G06Q 10/0875 |
| 2025/0265345 | A1* | 8/2025 | Kalapatapu | G06F 40/20 |
| 2025/0291898 | A1* | 9/2025 | Bu | G06N 7/01 |
| 2025/0291933 | A1* | 9/2025 | Bu | H04L 63/1433 |
| 2025/0317467 | A1* | 10/2025 | Bosch | H04L 63/1433 |
| 2026/0099610 | A1* | 4/2026 | Farrell | G06F 21/577 |

FOREIGN PATENT DOCUMENTS

| | | | | |
|---|---|---|---|---|
| EP | 4024252 A1 | | 7/2022 | |
| WO | WO-2014021866 A1 | * | 2/2014 | G06F 21/577 |
| WO | WO-2023283357 A1 | * | 1/2023 | G06F 11/3604 |
| WO | WO-2023114786 A1 | * | 6/2023 | H04L 67/12 |

OTHER PUBLICATIONS

Ferrag M.A., et al., “Revolutionizing Cyber Threat Detection with Large Language Models: A Privacy-Preserving BERT-Based Lightweight Model for IoT/IIoT Devices”, arXiv:2306.14263v2 [cs.CR], Feb. 8, 2024, 16 Pages.

Glanz L., et al., “A Vulnerability’s Lifetime: Enhancing Version Information in CVE Databases”, i-Know ’15: Proceedings of the 15th International Conference on Knowledge Technologies and Data-driven Business, Oct. 21, 2015, 4 Pages.

Kim A., et al., “AI-IDS: Application of Deep Learning to Real-Time Web Intrusion Detection”, IEEE Access, Apr. 10, 2020, vol. 8, pp. 70245-70261.

Lee J., et al., “Cyber Threat Detection Based on Artificial Neural Networks Using Event Profiles”, IEEE Access, Nov. 12, 2019, vol. 7, 165607-165626.

Sakaoglu S., “Kartal: Web Application Vulnerability Hunting Using Large Language Models”, KTH Royal Institute of Technology, Jun. 22, 2023, Retrieved from https://kth.diva-portal.org/smash/record.jsf?pid=diva2%3A1800421&dswid=-3473, 118 Pages.

Seyyar Y.E., et al., “An Attack Detection Framework Based on BERT and Deep Learning”, IEEE Access, vol. 10, 2021, Published on Jun. 23, 2022, pp. 1-13.

Yao S., et al., “React: Synergizing Reasoning and Acting in Language Models”, arXiv:2210.03629v3 [cs.CL], Mar. 10, 2023, pp. 1-33.

* cited by examiner

VULNERABILITY DETECTION AND DEFINITION USING A LARGE LANGUAGE MODEL

TECHNICAL FIELD

The present disclosure relates generally to computer networks and more particularly to vulnerability detection and definition using a large language model.

BACKGROUND

A Common Vulnerability and Exposure (CVE) record is a standardized mechanism that allows security personnel to reference and discuss a software vulnerability or exposure in a consistent manner. To this end, publicly-available CVE databases, such as the National Vulnerability Database (NVD), have arisen to allow security personnel across the globe to catalog and address vulnerabilities and exposures as they are discovered. Generally, each CVE entry in the database includes a unique identifier for the vulnerability or exposure, a description of the software affected by it (e.g., the name of the application, its affected versions, etc.), a description of available mitigation actions (e.g., available patches, new software versions, etc.), and the like.

An Intrusion Detection System (IDS) is a network security technology designed to monitor network traffic or system activities for suspicious or malicious behaviors and generate alerts when such activities are detected. Traditionally, an IDS work by seeking to match a request to a defined attack signature. These signatures are predefined patterns, rules, or characteristics that are indicative of known threats, attacks, or vulnerability exploitations, and are often crafted with a specific CVE in mind. Because signature-based approaches are time-consuming and inflexible, modern IDSs also rely on heuristics to identify suspicious activities based on broad behavioral rules, which allow an IDS to detect new types of threats as they arise, even without a matching signature. Consequently, many IDS alerts today lack any tie back to a particular CVE, either because of a lack of a signature that is explicitly associated with a CVE or because the IDS simply deemed the observed behavior as suspicious/anomalous using heuristics.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device identifies a first set of one or more Common Vulnerabilities and Exposures (CVEs) by searching a CVE database based on a request sent via a network towards a service. The device also identifies a second set of one or more CVEs by querying a large language model (LLM) based on the request. The device determines that the request is associated with a particular CVE based on the first set of one or more CVEs and the second set of one or more CVE. The device initiates a corrective measure with respect to the request in the network.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
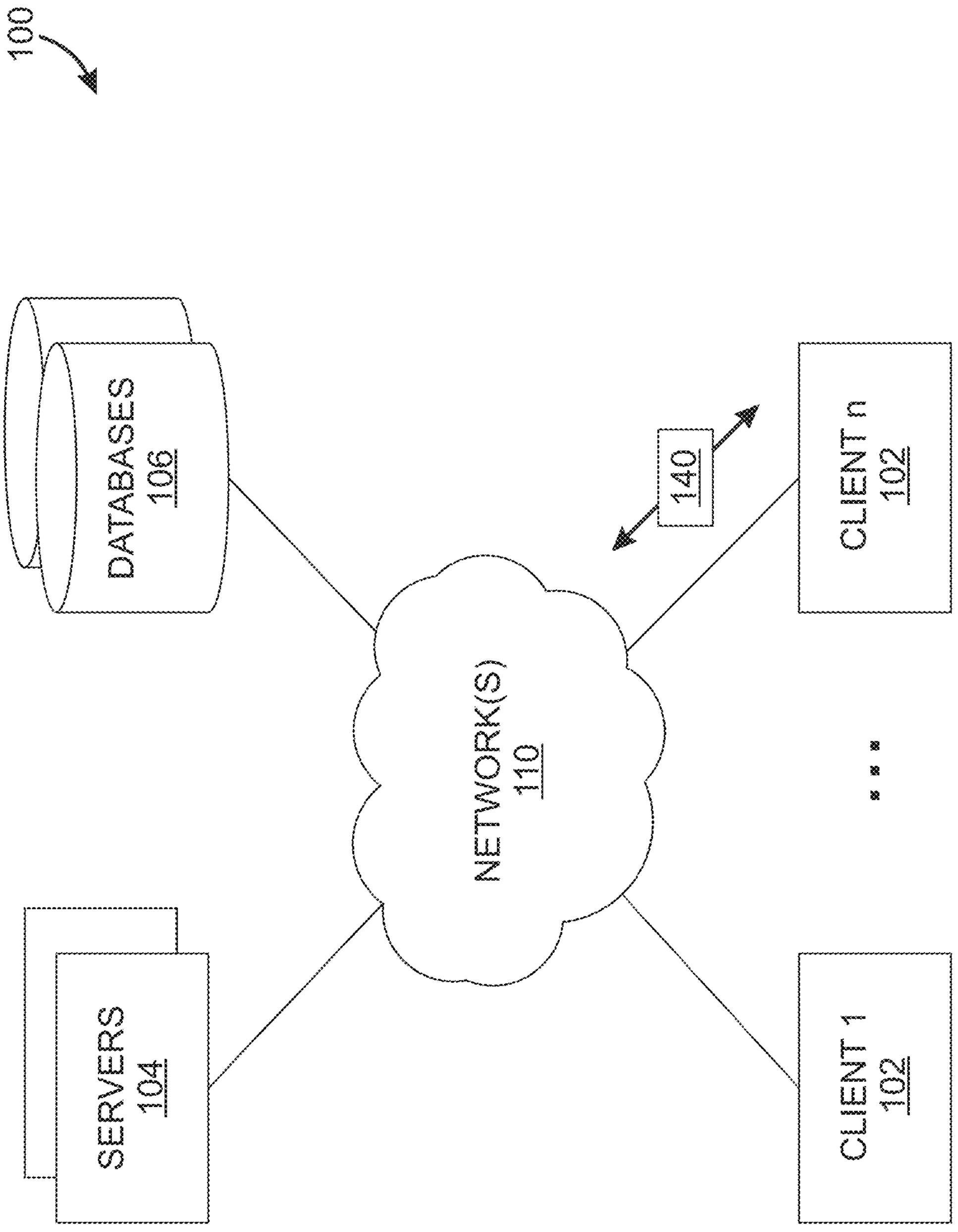
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
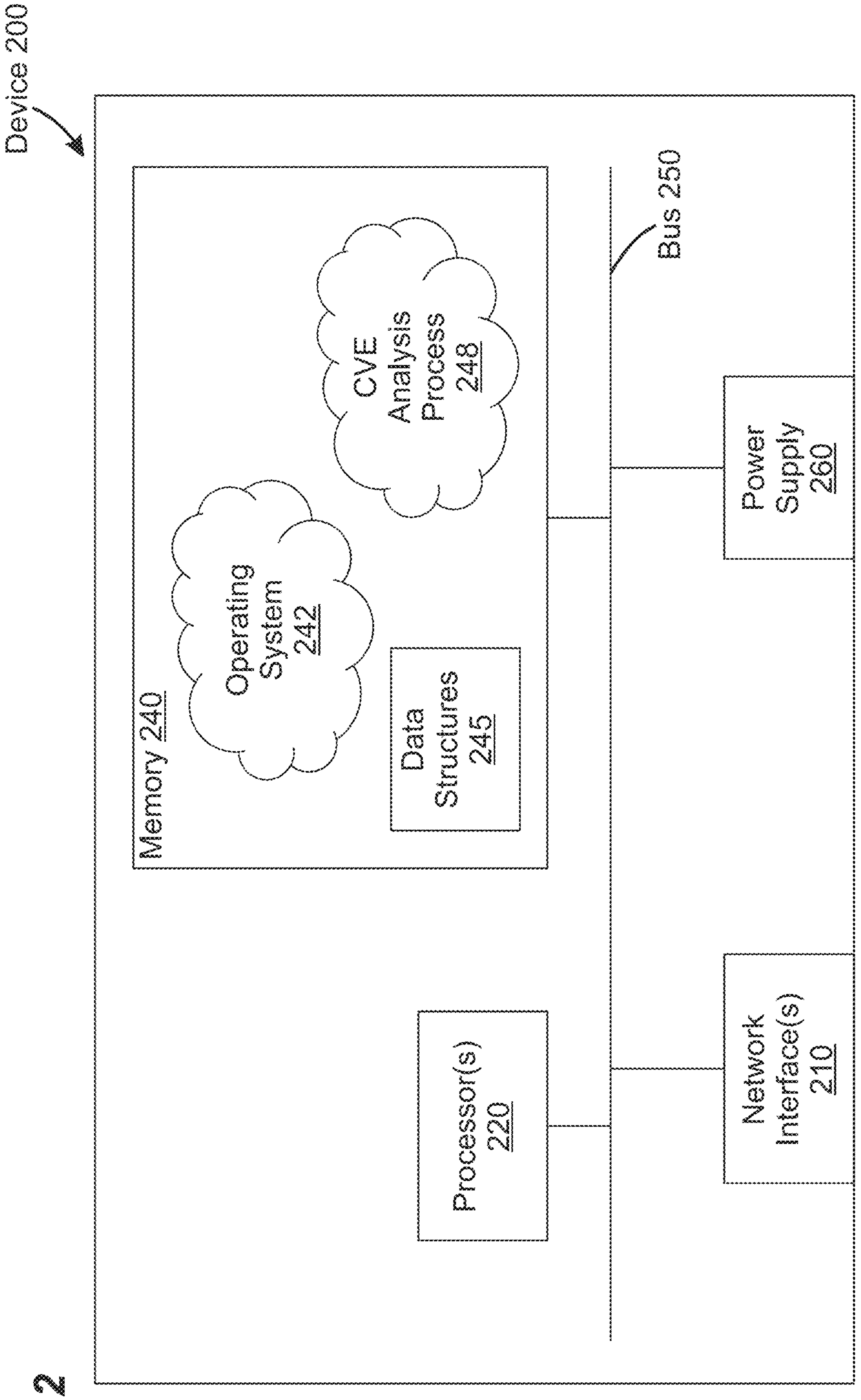
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative process such as CVE analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, CVE analysis process 248 may include computer executable instructions that, when executed by processor 220, cause device 200 to perform the techniques described herein. To do so, in some implementations, CVE analysis process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, CVE analysis process 248 may employ and/or be utilized to handle prompts to and/or access of one or more supervised, unsupervised, or semi-supervised machine learning models. Generally, supervised learning entails the use of a training set of data that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that CVE analysis process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time-series), random forest classification, or the like.

In further implementations, CVE analysis process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, CVE analysis process 248 may be a component of, use, and/or be utilized in the management of prompts/access to a generative model to generate configurations or other outputs based on a conversational input from a user (e.g., voice, text, etc.). In another example, CVE analysis process 248 may utilize a generative model with a method invocation data collector (MIDC) to assist in automated or manual identification of transactional attributes for spans. Example generative approaches can include, but are not limited to, generative adversarial networks (GANs), foundation models such as large language models (LLMs), other transformer models, and the like.

As noted above, Common Vulnerabilities and Exposures (CVEs) are wildly used across different network, application, and device security systems for various purposes. For instance, an Intrusion Detection System (IDS) is a network security technology designed to monitor network traffic or system activities for suspicious or malicious behavior and generate alerts when such activities are detected, typically with respect to a target application. Traditionally, an IDS works by looking for deviations from normal activity and known attack signatures. These signatures are predefined patterns, rules, or characteristics that are indicative of known threats, attacks, or vulnerability exploitations.

More specifically, a signature-based IDS may identify malicious activities by comparing observed network or system behavior against a database of predefined signatures. When it finds a match, the IDS generates an alert or takes other predefined actions. To remain effective, IDS signature databases need regular updates. Cybersecurity organizations and vendors continuously analyze new threats, vulnerabilities, and attack techniques to create and distribute updated signatures. The signature database includes signatures specific to Common Vulnerabilities and Exposures (CVE) exploitation, which are designed to detect attempts to exploit known vulnerabilities in software, systems, or applications.

A CVE is a standardized identifier for a software vulnerability or exposure, and it allows security professionals to reference and discuss vulnerabilities in a consistent manner. Based on the information provided in CVE entries, security experts create signatures that capture the specific patterns or characteristics associated with attempts to exploit the identified vulnerabilities. These signatures may include information such as payload content, packet structures, or sequences of actions typical of an exploitation attempt. As new vulnerabilities are discovered and assigned CVE numbers, corresponding signatures are created and added to the signature database of the IDS. Regular updates are crucial to ensuring that the IDS can effectively detect the latest threats.

More specifically, CVEs are typically handled and managed through a combination of processes, tools, and collaboration between various stakeholders in the cybersecurity community. CVEs are assigned and managed by the MITRE Corporation's CVE Program, which assigns a unique identifier (CVE ID) to each reported vulnerability. This CVE ID serves as a standardized reference for the vulnerability across different platforms and databases. Once a vulnerability is reported, the CVE Program assigns a CVE ID and creates a corresponding entry in the CVE database. This entry includes detailed information about the vulnerability, such as its description, affected software versions, severity rating, Common Vulnerability Scoring System (CVSS) score, and any available references or patches.

However, the current approach to generating signatures to identify specific CVE exploitations also suffers from the following drawbacks:

Time consuming: Manually creating signatures to identify a CVE exploitation is a time-consuming process. Security researchers and experts need to thoroughly analyze the details of each vulnerability, understand the potential attack vectors, and then create precise signatures. This can be a significant challenge, especially when dealing with a large number of vulnerabilities or frequent updates.

Human expertise: The manual creation of signatures requires skilled cybersecurity professionals who possess in-depth knowledge of both the vulnerabilities and the intricacies of network traffic. This expertise can be resource-intensive and may not be readily available in all organizations.

Limited scalability: As the number of software vulnerabilities and CVEs continues to grow, manually creating signatures becomes increasingly challenging to scale. Organizations with limited resources may struggle to keep up with the volume of new vulnerabilities and the corresponding need for updated signatures.

Maintenance: Regular updates and maintenance of signatures are essential to ensure effective detection. As new vulnerabilities are discovered and patches are released, ongoing efforts are required to update existing signatures and create new ones. This ongoing maintenance can be burdensome for organizations.

Alternatively, some IDS systems use heuristics to identify suspicious or malicious activity, but such heuristics cannot specifically point to the specific CVE that is being exploited. Knowing the specific CVE being exploited is valuable for alert prioritization, business impact and tracking the source of vulnerability. In addition, when the CVE is known, the user can follow the vendor recommendation for a fix and mitigate the vulnerability. In such cases, the time-to-fix is smaller since the end user is given a concrete security issue, and there is no need for a security specialist to investigate the IDS alerts. Having said that, having both heuristic detection and signature-based detection is important to obtain full security coverage.

—Vulnerability Detection and Definition Using an LLM—

The techniques herein allow for the identification of a specific CVE exploitation in network traffic without human signatures (e.g., in HTTP requests, etc.). In some aspects, the techniques herein may do so by leveraging an LLM-based architecture. Further aspects of the techniques herein are also able to automate the enrichment of CVE data, enabling organizations and security products to extract valuable insights and enhance their cybersecurity posture. By harnessing the power of LLMs, the techniques introduced herein intelligently analyze CVE descriptions to extract key properties such as affected services, ports, software components, and dependencies. This automated enrichment process provides organizations with a deeper understanding of vulnerabilities, allowing for more informed decision-making, smart context correlation, and prioritization of remediation efforts. Doing so also goes beyond simple keyword matching by leveraging contextual understanding and domain-specific knowledge to uncover hidden insights and relationships within CVE data. This enables organizations to identify emerging threats, correlate vulnerabilities with potential attack paths, and proactively mitigate security risks.

Illustratively, the techniques described herein may be performed by hardware, software, and/or firmware, such as in accordance with CVE analysis process 248, which may include computer executable instructions executed by the processor 220 (or independent processor of interfaces 210) to perform functions relating to the techniques described herein.

Specifically, according to various implementations, a device identifies a first set of one or more Common Vulnerabilities and Exposures (CVEs) by searching a CVE database based on a request sent via a network towards a service. The device also identifies a second set of one or more CVEs by querying a large language model (LLM) based on the request. The device determines that the request is associated with a particular CVE based on the first set of one or more CVEs and the second set of one or more CVE. The device initiates a corrective measure with respect to the request in the network.

Figure 3:
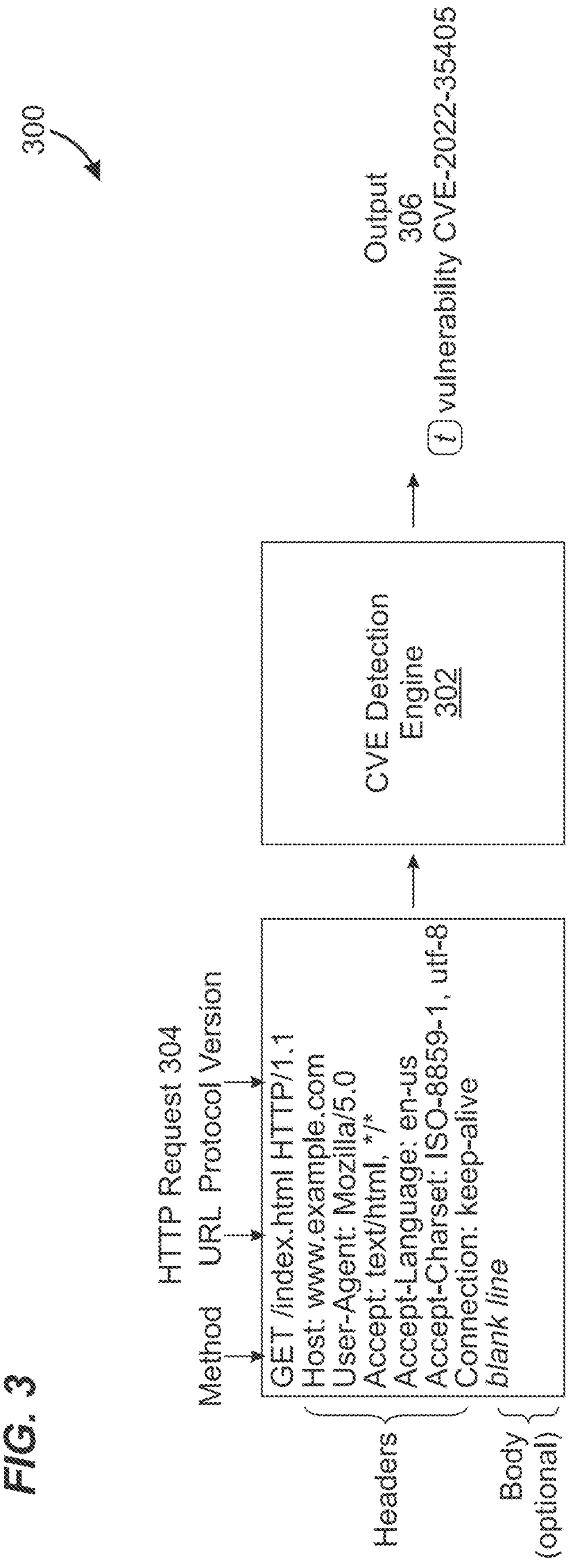
FIG. 3 illustrates an example of a Common Vulnerabilities and Exposure (CVE) detection engine assessing a request.

Operationally, FIG. 3 illustrates an example 300 of a CVE detection engine 302 assessing a request, in various implementations. As shown, assume that there is an HTTP request 304 sent via a network in which CVE detection engine 302 is located (e.g., hosted on a networking device). HTTP request 304 may include various fields, such as any or all of the following:

The method—e.g., GET, POST, CONNECT, etc.
The target URL
The protocol version
One or more headers
An optional body In various implementations, CVE detection engine 302 may perform a multi-classification of HTTP request 304 that aims to find the exact CVE ID related to HTTP request 304, if any (i.e., the specific CVE that HTTP request 304 seeks to exploit). As would be appreciated, this is in contrast to traditional IDS mechanisms which typically only perform a binary classification of the traffic, flagging it as either suspicious or not suspicious. Instead, HTTP request 304 may generate output 306, which indicates the specific CVE that HTTP request 304 is attempting to exploit. In turn, CVE detection engine 302 may raise an alert for presentation by a user interface to a security expert or other user, block HTTP request 304 from being sent to its destination, and/or take any other corrective measure.

Figure 4:
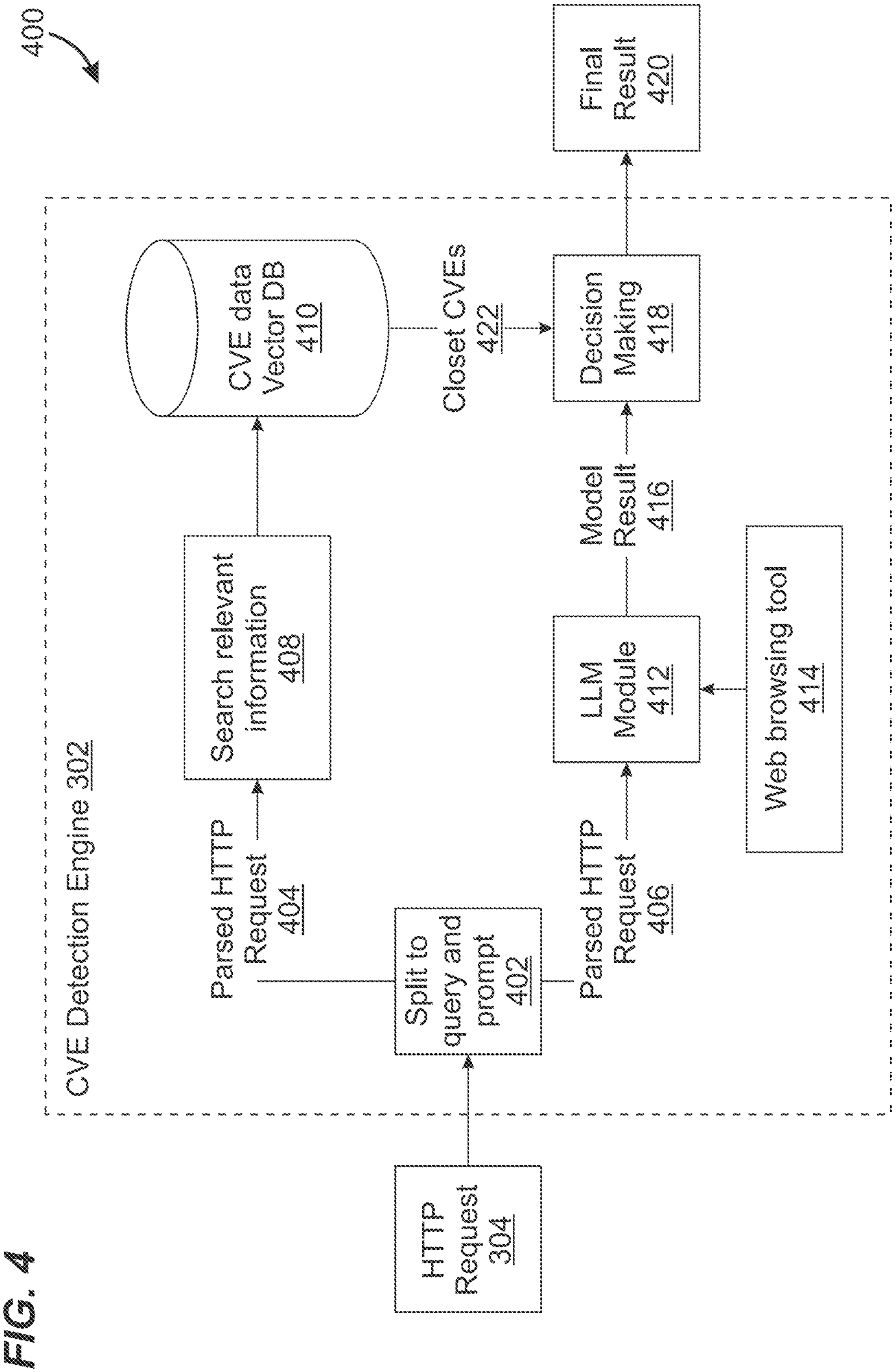
FIG. 4 illustrates an example architecture for a CVE detection engine.

FIG. 4 illustrates an example architecture 400 for CVE detection engine 302, in some implementations. As shown, CVE detection engine 302 may be implemented through execution of CVE analysis process 248 and include any or all of the following components: a request parser 402, a search module 408, a CVE vector database 410, an LLM module 412, a web browsing tool 414, and/or a decision making module 418. As would be appreciated, the functionalities of these modules may be combined or omitted as desired. In addition, further implementations of architecture 400 provide for any or all of these components to be executed in a distributed manner, in which case the executing devices can be viewed as a singular device for purposes of the teachings herein. For instance, LLM module 412 may itself include one or more LLMs or, alternatively, be configured to access any number of LLMs such as via their corresponding application programming interfaces (APIs).

In some implementations, CVE detection engine 302 may assess HTTP request 304 via two parallel processing tracks: 1.) a first path that leverages vector database (CVE vector database 410) that stores details on existing CVEs and 2.) a second path that leverages LLM module 412, which may be assisted by a ReAct agent for Internet browsing. In the first track, CVE vector database 410 is used for a similarity search between the parsed HTTP request 304 and existing CVEs vectors. In the second track, LLM module 412 asks one or more LLM models to reply with a CVE matching to the parsed HTTP request 304. Both answers are passed to decision making module 418 that considers the two answers, their source and confidence level, and decides on the final CVE to output as final result 420 (e.g., output 306 in FIG. 3).

More specifically, request parser 402 may take as input HTTP request 304 and parse it for analysis by each of the two processing tracks of CVE detection engine 302. For instance, request parser 402 may send parsed request 404 to search module 408 and parsed request 406 to LLM module 412 for their respective processing. Note, too, that parsed request 404 and parsed request 406 may also be different, in some instances. For instances, request parser 402 may generate parsed request 406 for LLM module 412 in part by taking into account the request length, body, or potential noise in HTTP request 304. This is because some attempted CVE exploits may include a large blob of binary data which can add noise and cause the LLM model to answer incorrectly. To avoid this, request parser 402 may truncate or cut the HTTP body content from HTTP request 304 and rely on other parts of the request such as the method, URI, parameters and headers, etc., when generating parsed request 406.

How request parser 402 parses HTTP request 304 to generate HTTP request 304 may depend on what CVE details are stored in CVE vector database 410. If the embedding in the vector database was done on CVE descriptions, then it may be more effective to parse only the HTTP request header part (everything excluding the body). Conversely, if the embedding in CVE vector database 410 was done on CVE exploits, then having the HTTP request body as part of the parsing might be crucial.

In response to receiving parsed request 406, LLM module 412 may select one or more LLMs to use, such as GPT-4 or Llama 2, among others. In some cases, the model can also be a fine-tuned model that observed CVEs details, their exploits and even traffic that contains CVEs exploitation. In some instances, LLM module 412 may allow the LLM to perform Internet web browsing, such as by using a ReAct agent or other suitable web browsing tool 414. This allows the LLM of LLM module 412 to interact with external tools to retrieve additional information that leads to more reliable and factual responses.

Given parsed request 406, LLM module 412 may use the LLM to determine the appropriate search query to run. The LLM then replies with the relevant search query forwarded to web browsing tool 414 to run that query. In turn, LLM module 412 takes the search response and passes it along with the original parsed request 406 to the LLM for a decision as to what the CVE is that is being exploited by HTTP request 304, if any. Here, web browsing tool 414 may provide additional context to the LLM of LLM module 412. In addition, by integrating LLM module 412 with the Internet, this allows its LLM to stay up to date with new CVEs exploits as they emerge. Finally, LLM module 412 outputs model result 416, which indicates either the CVE selected by the LLM or an indication that no CVE ID was identified as a good fit.

In the other processing track, search module 408 may take parsed request 404 as input and perform a search accordingly in CVE vector database 410. Note that there are many different sources that hold CVEs details, such as the National Vulnerability Database (NVD), MITRE, VULDB, Red Hat, Rapid7 and more. CVE details can include its ID, description, severity, Common Vulnerability Scoring System (CVSS) score, Common Weakness Enumeration (CWE), relevant products list, fix details, exploits and more. Those details hold information that might assist in determining the correlation between HTTP request 304 and a particular CVE ID. For example, the CVE description might contain the vulnerable HTTP request path, parameters, or headers.

An engineer may interact with CVE detection engine 302 via a user interface to specify the CVE detail or set of details to embed in CVE vector database 410 with a label in the metadata that saves the CVE ID. It is also possible to use multiple vector databases and embed in each a different CVE detail or set of details. Preferably, the description and exploits content are embedded in CVE vector database 410, together or separately.

To perform its search of CVE vector database 410, search module 408 may form an embedding of parsed request 404 and use it to perform a similarity search. Such a similarity search may return the vectors in CVE vector database 410 that are similar (close in high dimension) to the vector of the parsed request. The returned vectors will also include the CVE ID in their metadata. In turn, search module 408 may provide the closest CVE(s) 422 that it found to decision making module 418 for further consideration.

In various implementations, decision making module 418 may take model result 416 from LLM module 412 and the closest CVE(s) 422 found in CVE vector database 410, and generate the final result 420 based on them. Note that outputs model result 416 and CVE(s) 422 may be the same or different, depending on the circumstance. If they match, then decision making module 418 may simply output the common CVE ID as final result 420. However, if there is a mismatch, decision making module 418 may take into account factors such as the reliability of their sources, a prioritization mechanism, or the like, to select the most likely CVE from among them. As would be appreciated, one potential outcome is also the determination that HTTP request 304 is benign and is not attempting to exploit a CVE.

In some cases, the CVE information is not sufficient to create smart correlations between the CVE and the additional context. For example, in an attack path, a CVE can be correlated with one of the assets in the attack path. The CVE can influence the attack path probability or not and this depends on other factors such as running services, open ports, security controls and more.

Figure 5:
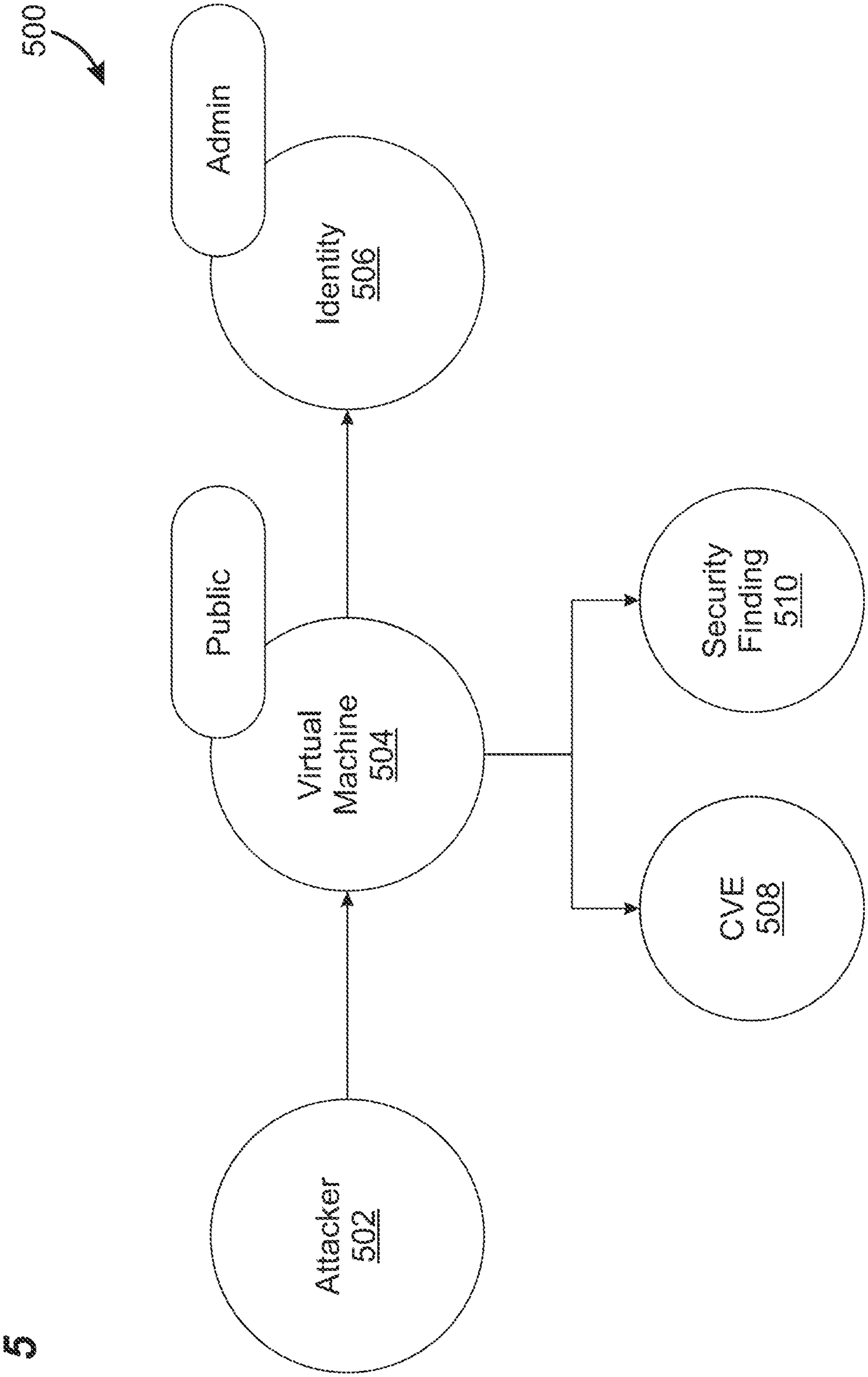
FIG. 5 illustrates an example cloud attack path.

As shown in FIG. 5, a common cloud attack path 500 for an attacker 502 is a compute asset, such as virtual machine 504 that is publicly accessible and attached to a powerful identity 506 in the cloud environment (e.g., administrator access over the account). Here, providing the CVE 508 associated with the attack in conjunction with the security finding 510 can serve as additional context. For example, a related security finding 510 can be "Machine uses IMDSV1" which is a security bad practice. Such misconfiguration increases the probability of an attacker obtaining the credentials of the attached identity, which in this case has admin privileges.

Typically, security mechanisms scan compute assets for CVEs and often find dozens of instances of CVEs that relate to a single compute asset (e.g., due to the version of its operating system not being up to date). Additionally, not all discovered CVEs are necessarily exploitable nor with the same severity. Presenting all CVEs as part of the attack path is useless and can cause confusion. It is essential to understand which CVEs support the exploitability of the attack path. In the above use case, it would be better to show only CVEs that are related to running software that opens external port, and that the CVE vulnerability is server side and not client side (so it will allow access to the identity token).

When provided with a CVE, the only information available for drawing inferences typically resides in its description. However, it is common for this description to lack essential properties like relevant services and ports.

Figure 6:
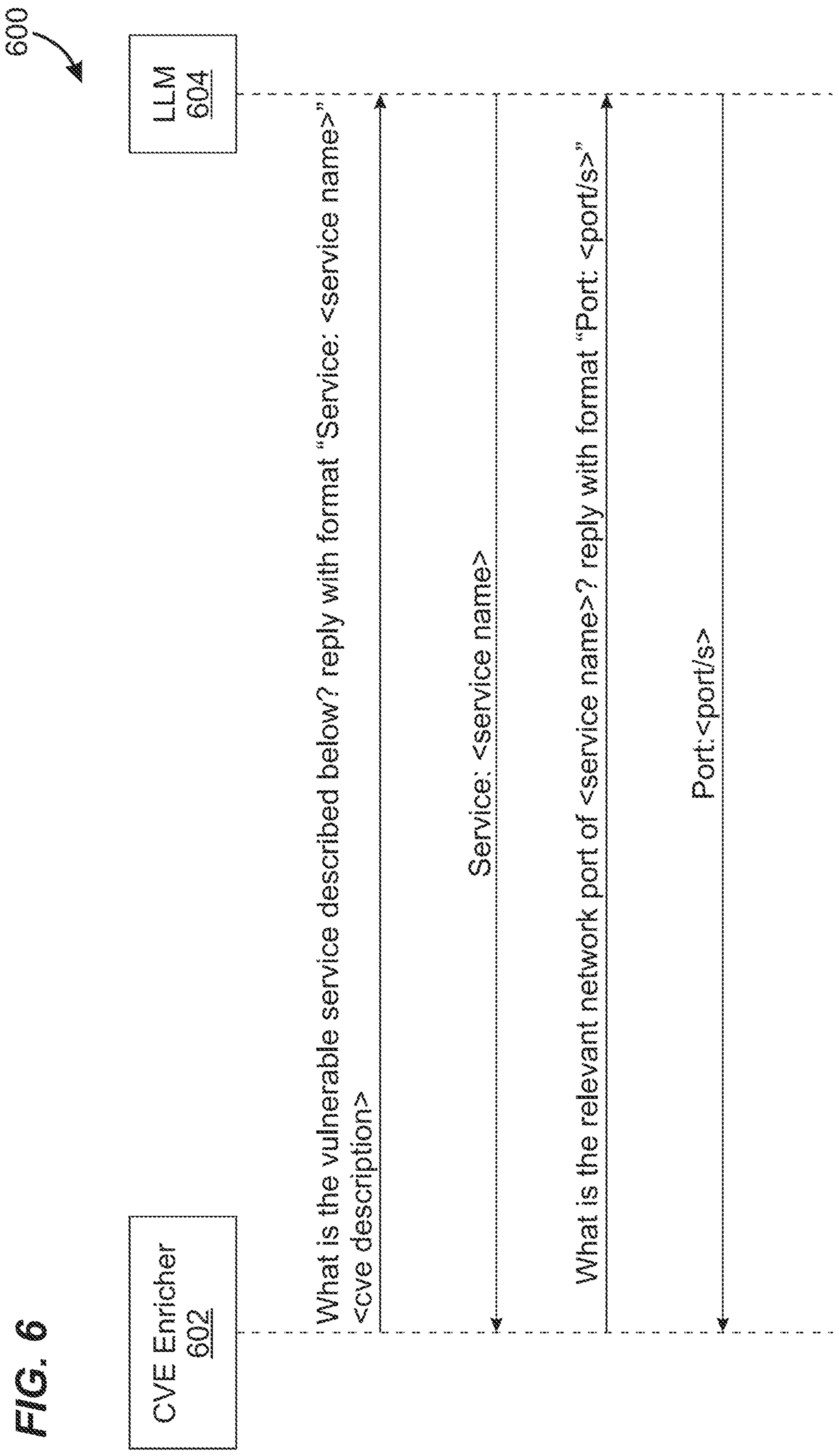
FIG. 6 illustrates an example diagram showing the use of a large language model (LLM) to enrich a CVE.

To this end, as shown in diagram 600 in FIG. 6, the techniques herein further introduce a CVE enrichment mechanism that utilizes an LLM 604 to extract additional properties for a given CVE. For instance, CVE enricher 602 (e.g., a component of CVE analysis process 248) may send a prompt of the following format to LLM 604: "What is the vulnerable service described below? reply with format "Service: <service name>" <cve description>."

In response, LLM 604 may return the service name according to the requested format. CVE enricher 602 may then issue a follow-up prompt such as "What is the relevant network port of <service name>? reply with format "Port: <port/s>"." In turn, LLM 604 may return the relevant port in the requested format.

Figure 7:
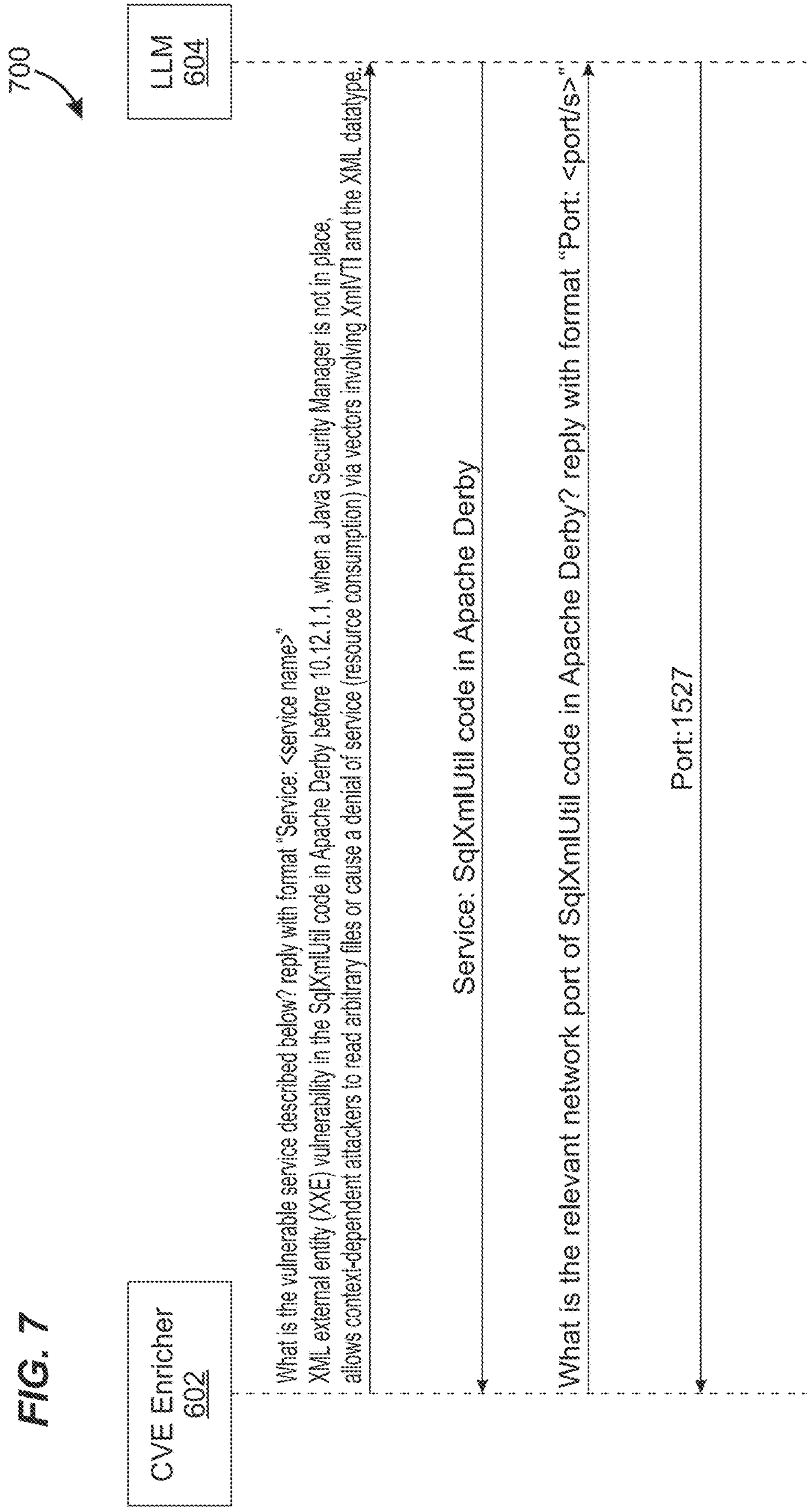
FIG. 7 illustrates an example showing the application of the techniques in FIG. 5 to a specific CVE.

FIG. 7 illustrates an example 700 showing the application of the techniques in FIG. 6 to a specific CVE, i.e., CVE-2015-1832. As shown, CVE enricher 602 may send the following prompt to LLM 604:

What is the vulnerable service described below? reply with format "Service: <service name>".

XML external entity (XXE) vulnerability in the SqlXmlUtil code in Apache Derby before 10.12.1.1, when a Java Security Manager is not in place, allows context-dependent attackers to read arbitrary files or cause a denial of service (resource consumption) via vectors involving XmlVTI and the XML datatype.

In response, LLM 604 returns the response: "Service: SqlXmlUtil code in Apache Derby." CVE enricher 602 then sends a follow-up prompt of "What is the relevant network port of SqlXmlUtil code in Apache Derby? reply with format "Port: <port/s>"." LLM 604 then responds with the context "Port: 1527."

Figure 8:
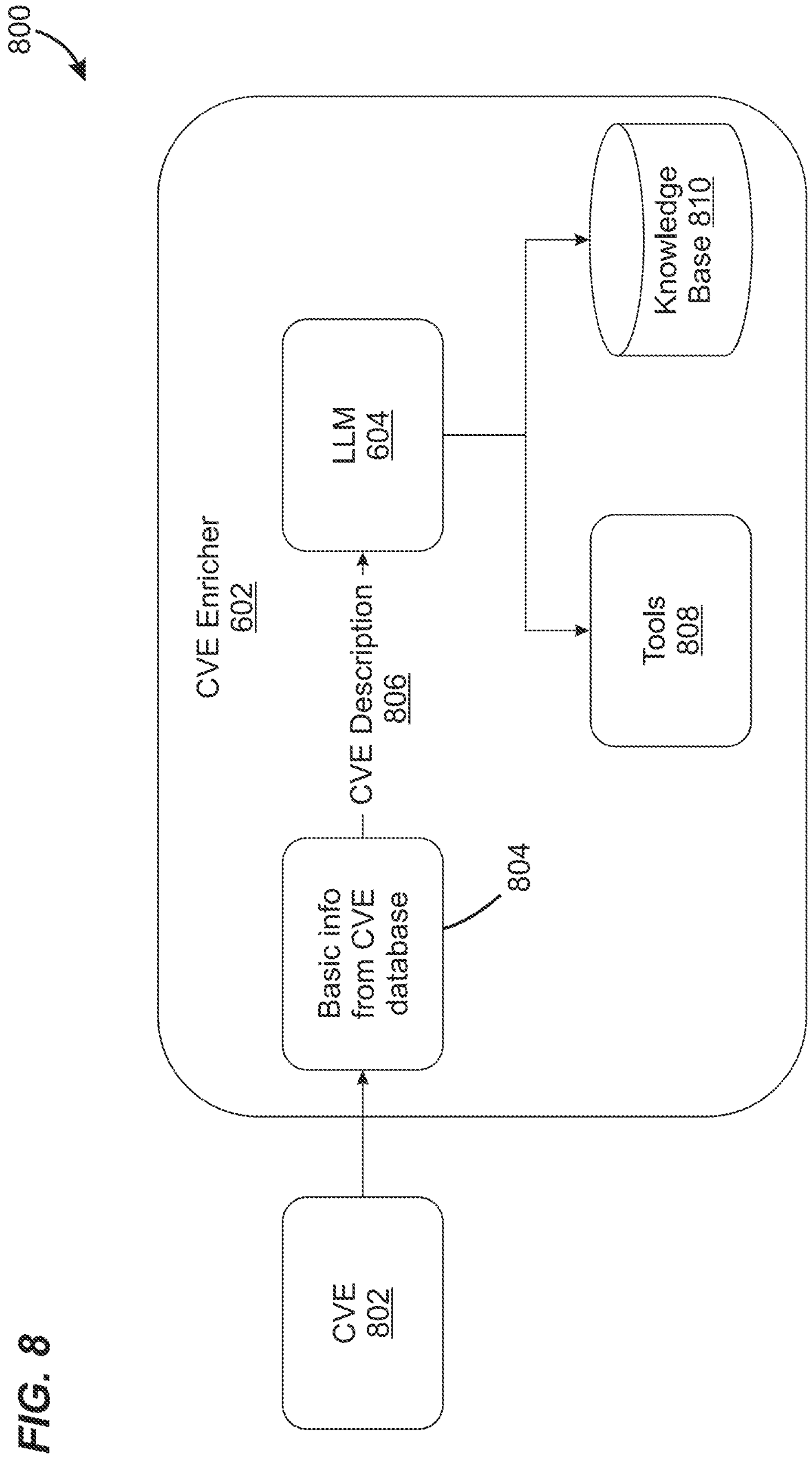
FIG. 8 illustrates an example architecture for a CVE enricher.

FIG. 8 illustrates an example architecture 800 for a CVE enricher, such as CVE enricher 602, in various implementations. As shown, CVE enricher 602 may receive a CVE 802 (e.g., a CVE ID) and perform a lookup for its basic information from a CVE database at block 804. From this, CVE enricher 602 may send an extracted CVE description 806 from the CVE database to LLM 604, which may be internal or external to CVE enricher 602. Through this interaction with LLM 604, CVE enricher 602 is able to identify the tools 808 associated with CVE 802 and store any additional context from LLM 604 in a knowledge base 810.

As would be appreciated, the additional CVE context captured by CVE enricher 602 can also be used to enhance the operations of CVE detection engine 302 described previously. For instance, as shown in FIG. 4, the additional context could be encoded and stored within CVE vector database 410 as the knowledge base. Doing so would allow for search module 408 to better match parsed request 404 to one or more CVEs in CVE vector database 410. In such a case, CVE enricher 602 may first obtain the CVE description from a publicly-available CVE database and enrich that information for local storage in CVE vector database 410.

Figure 9:
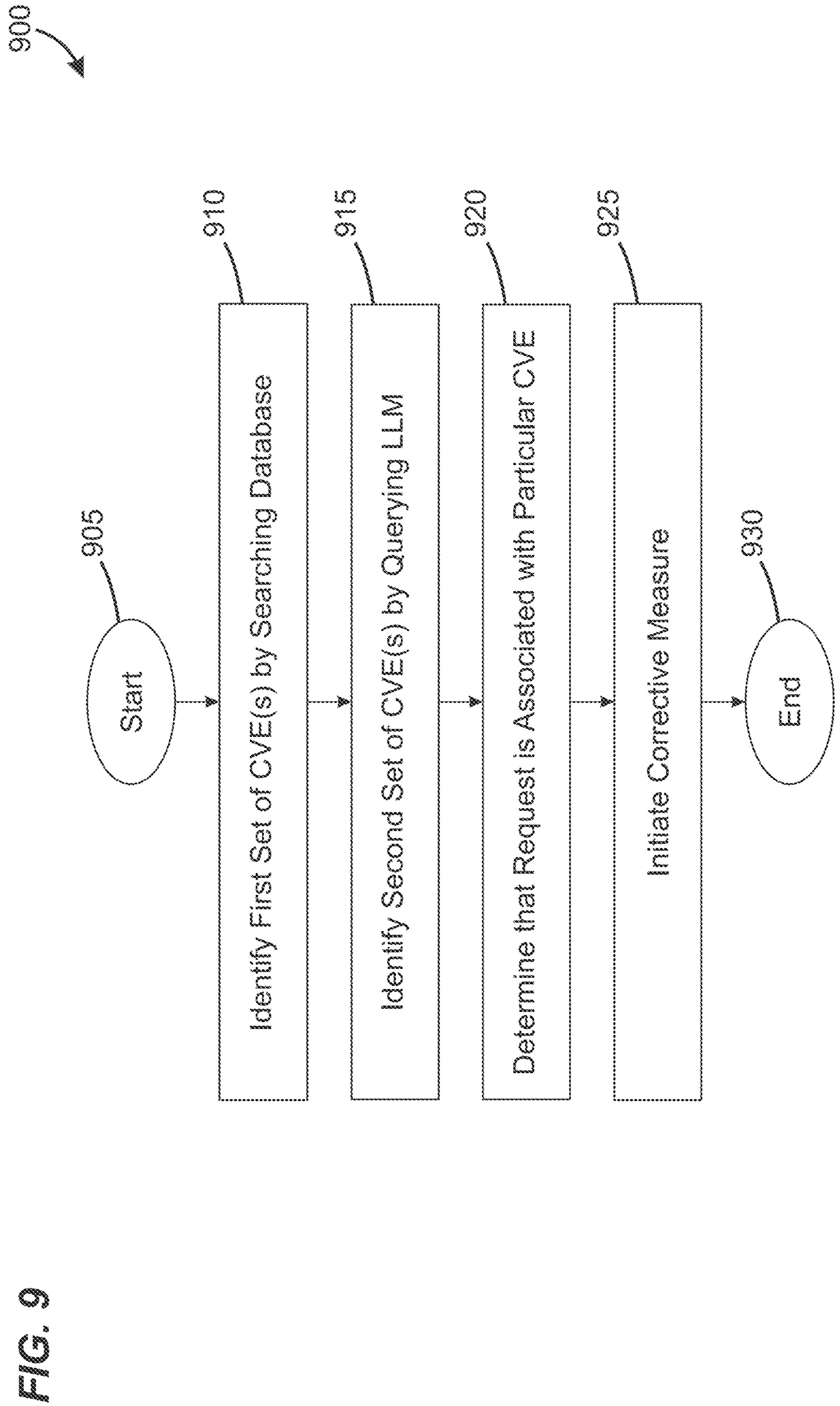
FIG. 9 illustrates an example simplified procedure for vulnerability detection and definition using a LLM, in accordance with one or more implementations described herein.

FIG. 9 illustrates an example of a simplified procedure for vulnerability detection and definition using a LLM, in accordance with one or more implementations described herein. For example, a non-generic, specifically configured device (e.g., device 200), may perform procedure 900 (e.g., a method) by executing stored instructions (e.g., CVE analysis process 248). The procedure 900 may start at step 905, and continues to step 910, where, as described in greater detail above, the device (e.g., a networking device, a server, etc.) may identify a first set of one or more Common Vulnerabilities and Exposures (CVEs) by searching a CVE database based on a request sent via a network towards a service. In some implementations, the device may also add context to the CVE database for the particular CVE using the LLM. In one instance, the context indicates a port associated with the particular CVE. In one implementation, the request is a Hypertext Transfer Protocol (HTTP) request.

At step 915, as detailed above, the device may identify a second set of one or more CVEs by querying a large language model (LLM) based on the request. In some cases, the LLM interacts with a web browsing tool to determine the second set of one or more CVEs. In one implementation, the device may generate a prompt for input to the LLM based on a description associated with the particular CVE.

At step 920, the device may determine that the request is associated with a particular CVE based on the first set of one or more CVEs and the second set of one or more CVEs, as described in greater detail above. For instance, the device may assess whether the sets overlap at the particular CVE, take into consideration factors such as the reliability of the sources, or the like.

At step 925, as detailed above, the device may initiate a corrective measure with respect to the request in the network. In some cases, the corrective measure comprises blocking the request from being sent to the service. In further cases, the corrective measure comprises sending an alert to a user interface indicative of the particular CVE. In some implementations, the device may also parse the request into first parsed data and second parsed data, to use the first parsed data to search the CVE database to identify the first set of one or more CVEs and use the second parsed data to query the LLM to identify the second set of one or more CVEs.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for vulnerability detection and definition using a LLM, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

identifying, by a device, a first set of one or more Common Vulnerabilities and Exposures (CVEs) by searching a CVE database based on a request sent via a network towards a service;

identifying, by the device, a second set of one or more CVEs by querying a large language model (LLM) based on the request;

determining, by the device, that the request is associated with a particular CVE based on the first set of one or more CVEs and the second set of one or more CVEs; and initiating, by the device, a corrective measure with respect to the request in the network.

2. The method as in claim 1, wherein the corrective measure comprises blocking the request from being sent to the service.

3. The method as in claim 1, wherein the corrective measure comprises sending an alert to a user interface indicative of the particular CVE.

4. The method as in claim 1, wherein the LLM interacts with a web browsing tool to determine the second set of one or more CVEs.

5. The method as in claim 1, further comprising:

adding context to the CVE database for the particular CVE using the LLM.

6. The method as in claim 5, wherein the context indicates a port associated with the particular CVE.

7. The method as in claim 1, further comprising:
generating a prompt for input to the LLM based on a description associated with the particular CVE.

8. The method as in claim 1, wherein the request is a Hypertext Transfer Protocol (HTTP) request.

9. The method as in claim 1, further comprising:
parsing the request into first parsed data and second parsed data, wherein the device uses the first parsed data to search the CVE database to identify the first set of one or more CVEs, and wherein the device uses the second parsed data to query the LLM to identify the second set of one or more CVEs.

10. The method as in claim 1, wherein the CVE database is a vector database.

11. An apparatus, comprising:
one or more network interfaces;
a processor coupled to the one or more network interfaces and configured to execute one or more processes; and
a memory configured to store a process that is executable by the processor, the process when executed configured to:
identify a first set of one or more Common Vulnerabilities and Exposures (CVEs) by searching a CVE database based on a request sent via a network towards a service;
identify a second set of one or more CVEs by querying a large language model (LLM) based on the request;
determine that the request is associated with a particular CVE based on the first set of one or more CVEs and the second set of one or more CVEs; and
initiate a corrective measure with respect to the request in the network.

12. The apparatus as in claim 11, wherein the corrective measure comprises blocking the request from being sent to the service.

13. The apparatus as in claim 11, wherein the corrective measure comprises sending an alert to a user interface indicative of the particular CVE.

14. The apparatus as in claim 11, wherein the LLM interacts with a web browsing tool to determine the second set of one or more CVEs.

15. The apparatus as in claim 11, wherein the process when executed is further configured to:
add context to the CVE database for the particular CVE using the LLM.

16. The apparatus as in claim 15, wherein the context indicates a port associated with the particular CVE.

17. The apparatus as in claim 11, wherein the process when executed is further configured to:
generate a prompt for input to the LLM based on a description associated with the particular CVE.

18. The apparatus as in claim 11, wherein the request is a Hypertext Transfer Protocol (HTTP) request.

19. The apparatus as in claim 15, wherein the process when executed is further configured to:
parse the request into first parsed data and second parsed data, wherein the apparatus uses the first parsed data to search the CVE database to identify the first set of one or more CVEs, and wherein the apparatus uses the second parsed data to query the LLM to identify the second set of one or more CVEs.

20. A tangible, non-transitory, computer-readable medium storing program instructions that cause a device to execute a process comprising:
identifying, by the device, a first set of one or more Common Vulnerabilities and Exposures (CVEs) by searching a CVE database based on a request sent via a network towards a service;
identifying, by the device, a second set of one or more CVEs by querying a large language model (LLM) based on the request;
determining, by the device, that the request is associated with a particular CVE based on the first set of one or more CVEs and the second set of one or more CVEs; and
initiating, by the device, a corrective measure with respect to the request in the network.

* * * * *